United States Patent

[11] 3,599,102

[72] Inventor Gerardus A. Mous
    Dunton, England
[21] Appl. No 5,509
[22] Filed Jan. 26, 1970
[45] Patented Aug. 10, 1971
[73] Assignee Cincinnati Milacron Inc.
    Cincinnati, Ohio

[54] DIGITAL PHASE DETECTOR
    3 Claims, 3 Drawing Figs.
[52] U.S. Cl. .................................................. 328/133,
    307/232, 307/265, 307/295, 324/83 D, 328/109
[51] Int. Cl. ................................................. H03d 13/00
[50] Field of Search ........................................... 307/232,
    265, 295; 328/109, 133; 324/83 D, 83 FE, 83 A;
    329/126

[56] References Cited
    UNITED STATES PATENTS
3,205,438  9/1965  Buck ............................ 324/83 A

| | | | |
|---|---|---|---|
| 3,328,688 | 6/1967 | Brooks .......................... | 324/83 A |
| 3,092,736 | 6/1963 | Ernyei ........................... | 328/133 X |
| 3,205,438 | 9/1965 | Buck ............................. | 328/133 X |
| 3,430,148 | 2/1969 | Miki ............................. | 307/232 X |
| 3,443,123 | 5/1969 | Leyde et al. .................... | 307/265 X |

Primary Examiner—Stanley T. Krawczewicz
Attorneys—Howard T. Keiser and Jack J. Earl ABSTRACT: An apparatus for providing a digital output analogous to a phase difference greater than a predetermined magnitude between two asynchronous inputs of the same frequency. After synchronization with an input reference frequency, a pulse width is produced representative of the phase difference between the inputs. The pulse width is reduced by a predetermined magnitude; and a number of pulses is output proportional to the time duration of the new smaller pulse width.

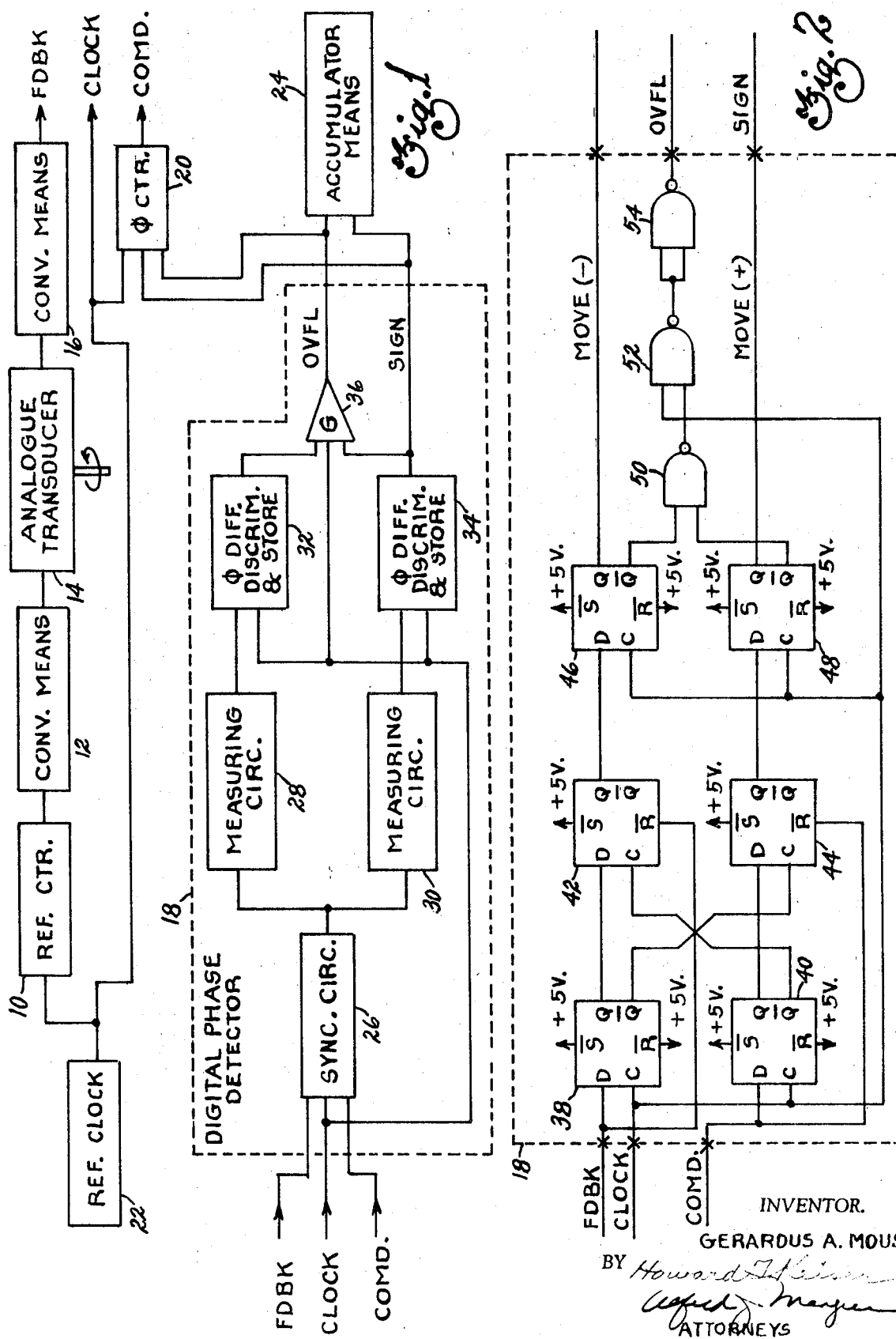

DIGITAL PHASE DETECTOR

BACKGROUND OF THE INVENTION

The present invention relates generally to the area of phase sensing and detection, and more particularly to a totally digital phase detector providing a digital output representing the phase difference between two asynchronous signals of the same frequency.

In the past, phase detectors had, at the most, very few digital components. This was a result of the electrically impure environment in which the circuits had to operate. This environment results in signals having ill defined pulse transitions and noise spikes of substantial magnitude. Since digital circuits are edge sensitive devices and responsive to noise and other signal irregularities, such circuits are difficult to use and generally impractical as phase detectors. These disadvantages are obviated by the apparatus disclosed which is a wholly digital phase detector that has a high immunity to noise and unstable pulse edges.

SUMMARY OF THE INVENTION

The invention disclosed is a phase detector for producing a number of pulses proportional to a phase difference between asynchronous inputs of the same frequency. The detector is insensitive to minute phase differences and requires a phase difference of a predetermined magnitude before producing an output. First, the detector synchronizes transitions of the inputs with respect to a reference clock frequency. Second, a detection circuit produces an error signal representative of the phase difference between the inputs. This error signal is compared to a reference representing the minimum magnitude of phase difference to be detected. Finally, the excess of the error signal over the reference is gated with a source of pulses, and a number of pulses is output from the detector proportional to the magnitude of the phase difference between the inputs minus the minimum magnitude of phase difference to be detected. In addition, the detection circuit produces a binary signal indicative of the sign or direction of the phase difference.

DESCRIPTION OF DRAWINGS

FIG. 1 is a schematic block diagram illustrating how the phase detector may be applied in a digital measuring system.

FIG. 2 is a detailed schematic diagram of the phase detector.

DESCRIPTION OF OPERATION

Figure 3:
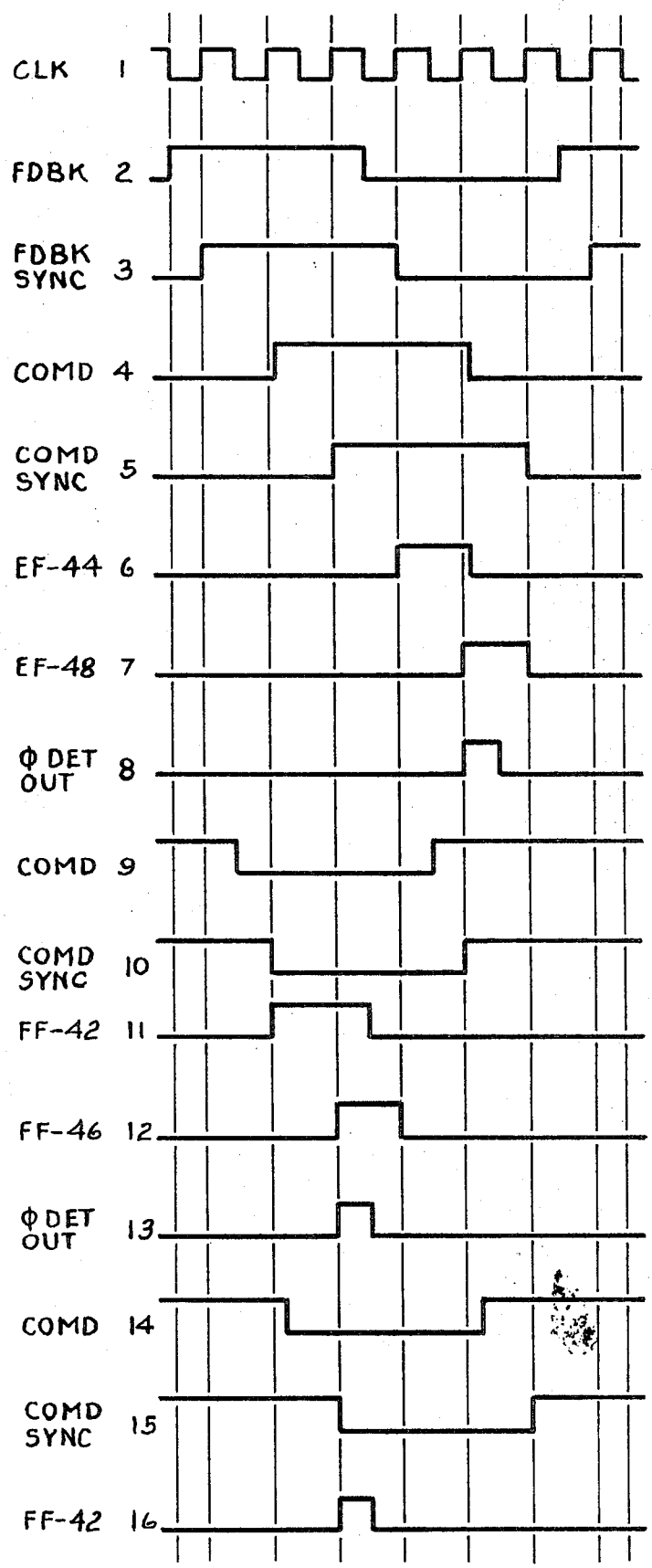
FIG. 3 is a synchrogram showing the time relationship between signals at various points in the phase detector.

Referring to FIG. 1, the solid lines connecting the blocks are only indications of information flow and do not represent specific wiring connections. It is to be understood that the phase detector's use in this circuit configuration is not meant to be a limitation on its application. The detector is applicable whenever a digital representation analogous to phase error between two asynchronous inputs of the same frequency is needed. A reference counter 10 supplies a constant frequency square wave signal. The reference counter 10 is comprised of a group of serially connected flip-flops in a configuration well known to those skilled in the art. This signal is converted for use in an analog transducer 14 by an appropriate conversion means 12. The analog transducer 14 upon receiving a mechanical input of a given magnitude will shift the phase of its electrical output with respect to its electrical input an amount proportional to said magnitude. This signal is reconverted by converter means 16 into a square wave of the same frequency as the reference output but shifted in phase an amount proportional to the mechanical input of the transducer. This signal is designated the feedback signal and is the first input waveform to the digital phase detector 18. A second input waveform to the phase detector 18 is the output of the phase counter 20. The phase counter 20 is similar in construction to the reference counter 10; however, it has add and delete circuitry on its input to incrementally change the period of its output and consequently its phase relation to the feedback signal. The output is a square wave signal of the same frequency and initially in phase with the output of the reference counter. The third input to the phase counter 18 is a source of pulses from the reference clock 22, which for purposes of illustration is derived from an associated clock system. The period of the reference clock frequency is a time duration representative of the minimum increment of phase error to be detected. Briefly, the operation is as follows. The reference and phase counters 10 and 20 are initially in phase. A mechanical input to the transducer 14 shifts the phase of its output a proportional amount. This phase difference is detected in the phase detector 18 which outputs a number of pulses representing the magnitude of the phase difference and a binary signal indicating the sign or direction. This information is used to update the phase counter 20, thereby shifting its output in phase with respect to the feedback signal. The detector also updates an accumulator means 24 which contains the absolute position of the movement detected by the transducer.

The first element in the phase detector 18 is a synchronization circuit 26. Even though the command and feedback signals are generated by a common clock frequency, propogation delays through the devices and transmission lines result in an asynchronous relation to said clock on the phase detector input. In addition, the transition points are relatively noisy and not suitable for use on edge sensitive devices. Hence, the synchronous circuit 26 provides synchronized command and feedback signals that have clean transitions in an established relation to the reference clock. With the input synchronized, it is now possible to accurately measure a phase difference in the first and second measuring stages 28 and 30. These detectors are identical circuits. One of the measuring circuits checks the state of the synchronized feedback signal at a transition point of the synchronized command signal. Likewise, the other measuring circuit checks the state of the synchronized command signal on a transition of the synchronized feedback signal. If a change in state is detected, the outputs are returned to their original states by the next transition of the input of the signal being checked. Therefore, if a phase difference exists, one of the measuring devices will have an error signal output of a pulse width proportional to the magnitude of said difference. The sign or direction of the phase difference is determined by sensing which one of the measuring devices responds. On the outputs of the measuring devices 28 and 30 are error discriminators and stores 32 and 34 respectively, which function with the reference clock. The error stores do not function until the next pulse of the reference that synchronized the inputs producing the phase difference. Therefore, they will only produce an output if the inputs represent a time difference that contains two or more positive going transitions of the reference frequency. If the reference pulse period represents the minimum magnitude of phase difference to be detected, the pulse width from the measuring devices must have that time duration or greater before they are stored. The output of either store can be used as a sign signal. In addition, they are gated together with the clock reference in the gating network 36. The network 36 produces a string of pulses having a number of pulses proportional to the time duration of the pulse width in the stores. Hence, the gate 36 operates as an analog to digital converter.

Referring to FIG. 2 which illustrates the preferred embodiment, the synchronization circuit is comprised of two logic flip-flops 38 and 40. One operates on the command signal and the other on the feedback signal. Any transition appearing on the input will not be seen on the output until the next transition of the clock. This action is best illustrated by curves 1, 2 and 3; 1, 4 and 5; 1, 9 and 10; and 1, 14, and 15 of the synchrogram of FIG. 3. In a measuring system as earlier discussed, the command signal responds to changes in the feedback signal; therefore, the phase difference will be described by defining the command signal with respect to the feedback signal. Curves 1 through 8 illustrate the condition when the command input leads in time the feedback input. Curves 1, 2, 3 and 9 through 13 illustrate the condition of the command input lagging in time the feedback input. Curves 1, 2, 3 and 14 through 16 show the condition where the command input lags the feedback input, by an amount that does not produce an error output.

The synchronized signals are used in the measuring stage to generate a pulse width output representing the magnitude of error. The measuring is performed by two logic flip-flops 42 and 44. On a transition of the synchronized command signal, flip-flop 42 looks at the state of the synchronized feedback signal. If the feedback is high or at some positive voltage level, the output of flip-flop 42 will go high until reset by input 43 on the next transition of the unsynchronized feedback input. Flip-flop 42 starts to measure on a negative transition or one that goes from a positive voltage level to ground of the synchronized command signal. The measuring ends on the next negative transition of the unsynchronized feedback. Hence, flip-flop 42 generates a pulse width proportional to phase difference and represents a lag in time of the command with respect to the feedback. Curve 11 in FIG. 3 illustrates the output of flip-flop 42 in this situation. In a similar manner, flip-flop 44 outputs a pulse width proportional to phase difference and represents a lead in time of the command with respect to the feedback. The output of flip-flop 44 for this phase relationship is shown in Curve 6 of FIG. 3. If a phase difference exists, either flip-flop 42 or flip-flop 44 will have an output depending on the phase relation of the difference. By detecting which flip-flop does the measuring, the sign may be determined. Flip-flops 46 and 48 function as discriminators and error stores. Assume there is an output from the measuring stage 42. The output will occur on a transition of the synchronized command signal which in turn occurs on a transition of the reference clock input. The reference clock also drives the comparator and storage element 46 and 48. The flip-flop 46 will not detect the output of flip-flop 42 until the next periodic transition of the reference clock. It was assumed in the beginning that the period of the reference clock frequency has a time duration representing a minimum increment of phase difference to be detected. Therefore, before it is stored in flip-flop 46, the output pulse width of flip-flop 42 must be equal to or greater than the period of the reference clock frequency. Hence, the flip-flop 46 operates as a discriminator to reject small phase differences. Flip-flop 48 operates in a similar manner to discriminate and store the output of flip-flop 44. Curves 12 and 7 of FIG. 3 illustrate the corresponding outputs of flip-flops 46 and 48 when detectable outputs exist on flip-flops 42 and 44, respectively. Flip-flops 46 and 48 incrementally output a pulse width representing phase differences for a time duration proportional to the phase difference minus the minimum increment of detection or a period of the reference clock. These signals are gated together and NAND gate 50, and the output is gated with the reference clock in NAND gate 52. NAND gate 52 is essentially an analog to digital converter. It converts a pulse width analogous to the magnitude of the phase difference into a number of error pulses. Each error pulse will be weighted according to the period of the reference clock, and the total number will equal the magnitude of phase difference. These pulses are inverted in an inverter 54 and output for use in the system. Curves 13 and 8 illustrate the digital output of the phase detector when phase differences produce outputs from flip-flops 46 and 48 as shown in Curves 17 and 7, respectively. As indicated in FIG. 2, either flip-flop 46 or flip-flop 48 or both may be used to determine the sign of the phase difference.

Curves 14 and 15 of FIG. 3 illustrate the condition where the command input lags the feedback input but not in a detectable amount. Curve 16 is the output of flip-flop 42 and, of course, there is no phase detector output.

As mentioned earlier, this is only one embodiment of the detection circuit. The resolution may be changed by simply using a different reference clock frequency throughout the whole phase detector. There may be situations where the inputs are synchronized with the reference clock. In these cases, the synchronization circuits may be eliminated. Consequently, many circuit deviations may be practiced that are within the spirit and scope of this application.

What I claim is:

1. An apparatus for producing a number of error pulses proportional to a phase difference greater than a predetermined phase difference magnitude between two input signals of the same frequency, the apparatus comprising
   a. means for producing output pulses having a pulse period that is a function of the time equivalent of the predetermined phase difference magnitude;
   b. means responsive to the input signals and the output pulses for synchronizing transitions of the input signals with transitions of the output pulses;
   c. means responsive to the input signals and connected to the synchronizing means for generating an output signal having a pulse width representing a phase difference between the input signals;
   d. means coupled to the producing means the the generating means for comparing the output signal with the output pulses and storing an error signal having a pulse width representing the difference between the pulse width of the output signal and the output pulse period; and
   e. means responsive to the error signal and the output pulses for providing
      1. a number of error pulses proportional to the pulse width of the error signal, and
      2. a binary signal designating the sign of the phase difference between the input signals.

2. An apparatus for generating error pulses representing a phase difference in excess of predetermined phase difference magnitude between first and second input signals of the same frequency, said apparatus comprising:
   a. means for producing constant frequency output pulses having a pulse period that is a function of the predetermined phase difference magnitude;
   b. means responsive to the input signals and the output pulses for synchronizing transitions of the input signals with transitions of the output pulses;
   c. means responsive to the first input signal and connected to the synchronizing means for measuring a lag in time of the second input signal with respect to the first input signal;
   d. means responsive to the second input signal and connected to the synchronizing means for measuring a lag in time of the first input signal with respect to the second input signal;
   e. means connected to the measuring means and the producing means for storing an error signal having a pulse width representing the lag in time between the input signals minus a time period equivalent to the predetermined phase difference magnitude; and
   f. means coupled to the storing means and the producing means for providing
      1. a number of error pulses proportional to the pulse width of the stored error signal, and
      2. a binary signal designating the sign of the phase difference between the input signals.

3. An apparatus for producing a number of error pulses representing a phase difference greater than a predetermined phase difference between two input signals of the same frequency, the apparatus comprising:
   a. means for producing output pulses having an pulse period equal to the time equivalent of the predetermined phase difference;
   b. means responsive to the input signals and the output pulses for supplying 1. from on of the input signals, a first output signal having the same frequency as the input signals but having a minimal time differential between its transition and corresponding transitions of the output pulses, and
2. from the other of the input signals, a second output signal having the same frequency as the input signals but having a minimum time differential between its transitions and corresponding transitions of the output pulses;
c. means responsive to the first output signal, the second output signal, and one of the input signals for generating a first signal having a pulse width equal to the time from a transition of the second output signal to the next corresponding transition of the one of the input signals;
d. means responsive to the first output signal, the second output signal, and the other of the input signal for generating a second signal having a pulse width equal to the time from a transition of the first output signal to the next corresponding transition of the other of the input signals;
e. means responsive to the first signal and the output pulses for storing a first error signal having a pulse width representing the magnitude of the pulse width of the first signal that exceeds the period of an output pulse;
f. means responsive to the second signal and the output pulses for storing a second error signal having a pulse width representing the magnitude of the pulse width of the second signal that exceeds the period of an output pulse; and
g. means connected to the storing means and the producing means for providing
1. a number of error pulses, said number being proportional to the pulse width of an error signal stored in the storing means, and
2. a binary signal defining the direction of the phase difference between the input signals.